United States Patent
Moy et al.

(10) Patent No.: US 7,634,163 B2
(45) Date of Patent: Dec. 15, 2009

(54) PROCESS AND DEVICE FOR POSITIONING AN OPTICAL COMPONENT BETWEEN TWO OPTICAL FIBRES

(75) Inventors: Jean-Pierre Moy, Saint Egreve (FR); Romain Ramel, Saint Egreve (FR); Emmanuel Dhardemare, Grenoble (FR)

(73) Assignee: Atmel Grenoble S.A., Saint Egreve (FR)

( * ) Notice: Subject to any disclaimer, the term of this patent is extended or adjusted under 35 U.S.C. 154(b) by 0 days.

(21) Appl. No.: 10/518,082

(22) PCT Filed: Jul. 18, 2003

(86) PCT No.: PCT/FR03/02289

§ 371 (c)(1),
(2), (4) Date: Aug. 9, 2005

(87) PCT Pub. No.: WO2004/013669

PCT Pub. Date: Feb. 12, 2004

(65) Prior Publication Data

US 2006/0051020 A1    Mar. 9, 2006

(30) Foreign Application Priority Data

Jul. 26, 2002 (FR) .................................. 02 09534

(51) Int. Cl.
G02B 6/26 (2006.01)
G02B 6/38 (2006.01)
G02B 6/32 (2006.01)

(52) U.S. Cl. .............................. 385/50; 385/33; 385/72; 385/73; 385/74

(58) Field of Classification Search .................. 385/33, 385/50, 72–74
See application file for complete search history.

(56) References Cited

U.S. PATENT DOCUMENTS

| 4,285,571 | A | * | 8/1981 | Winzer | 385/34 |
| 4,682,018 | A | | 7/1987 | Moy | |
| 4,743,751 | A | | 5/1988 | Arques et al. | |
| 4,893,890 | A | * | 1/1990 | Lutes | 385/27 |
| 5,325,456 | A | * | 6/1994 | Cullen et al. | 385/138 |
| 5,375,181 | A | | 12/1994 | Miller | |
| 5,706,371 | A | * | 1/1998 | Pan | 385/11 |

(Continued)

FOREIGN PATENT DOCUMENTS

EP    0 852 338 A    7/1998

OTHER PUBLICATIONS

A. Spisser et al., "Highly Selective 1.55 micrometer InP/airgap micromachined Fabry-Perot filter for optical communications", in Electronics Letters, No. 34(5), pp. 453-454, 1998.

*Primary Examiner*—Uyen Chau N Le
*Assistant Examiner*—Rhonda S Peace
(74) *Attorney, Agent, or Firm*—Lowe Hauptman Ham & Berner, LLP

(57) ABSTRACT

The invention pertains to a process and to a device for positioning an optical component between two optical fibers furnished at their end with lenses comprising: drilling a support in such a way as to fix therein a capillary tube whose inside diameter is designed to slip an optical fiber thereinto, fixing the capillary tube in the drilling of the support, making a blind cut of the support and of the capillary tube, in such a way as to separate the capillary tube into two parts, a first plane face of the cut being perpendicular to a longitudinal axis of the capillary tube, positioning the component on the first plane face, positioning an optical fiber in each of the parts. The device comprises a support through which is fixed a capillary tube, the support comprising a cut so as to separate the capillary tube into two parts. The cut comprises a first plane face perpendicular to a longitudinal axis of the capillary tube. The component is positioned on the first plane face.

14 Claims, 2 Drawing Sheets

U.S. PATENT DOCUMENTS

| | | |
|---|---|---|
| 5,815,497 A | 9/1998 | Ramel |
| 5,850,390 A | 12/1998 | Ramel |
| 5,864,577 A | 1/1999 | Ramel |
| 5,973,327 A | 10/1999 | Moy et al. |
| 6,118,915 A * | 9/2000 | Sato ............................ 385/39 |
| 6,272,264 B1 * | 8/2001 | Li et al. ........................ 385/27 |
| 6,282,339 B1 * | 8/2001 | Zheng ........................ 385/34 |
| 6,485,191 B1 * | 11/2002 | Sato ............................ 385/73 |
| 6,512,231 B1 | 1/2003 | Moy |
| 6,535,655 B1 * | 3/2003 | Hasui et al. .................... 385/11 |
| 6,580,842 B1 * | 6/2003 | Hehlen et al. ................. 385/11 |
| 6,583,419 B1 | 6/2003 | Moy et al. |
| 6,625,174 B1 | 9/2003 | Hethuin et al. |
| 6,665,464 B2 * | 12/2003 | Suzuki et al. ................. 385/19 |
| 6,892,009 B2 * | 5/2005 | Ito et al. ....................... 385/49 |
| 6,920,255 B2 * | 7/2005 | Hasui et al. .................... 385/11 |
| 7,172,344 B2 * | 2/2007 | Nishihara et al. ............. 385/65 |
| 2004/0067023 A1 * | 4/2004 | Hanashima et al. ........... 385/43 |

* cited by examiner

PROCESS AND DEVICE FOR POSITIONING AN OPTICAL COMPONENT BETWEEN TWO OPTICAL FIBRES

CROSS-REFERENCE TO RELATED APPLICATIONS

The present Application is based on International Application No. PCT/FR2003/002289, filed on Jul. 18, 2003, which in turn corresponds to FR 02/09534 filed on Jul. 26, 2002, and priority is hereby claimed under 35 USC § 119 based on these applications. Each of these applications are hereby incorporated by reference in their entirety into the present application.

FIELD OF THE INVENTION

The invention pertains to a process and to a device for positioning an optical component between two optical fibers.

BACKGROUND OF THE INVENTION

To present the invention, the standpoint adopted is that of the field of fiber optic telecommunications and the component described is a filter making it possible to isolate a single wavelength, often called "channel" from among all those that travel around an optical network. This is achieved by placing in the light beam a filter whose passband is chosen in such a way as to best transmit the channel at the targeted wavelength and its entire modulation, and to stop the other channels.

The invention is of course not limited to the field of fiber optic telecommunications nor to a filter placed between two optical fibers. Other optical components such as for example polarizing crystals may call for this configuration between two optical fibers.

It is particularly advantageous to make filters that can be tuned via an electrical voltage, that can thus be adjusted to the desired channel, and to change channel at will as required. This idea has been developed and repeated by numerous authors. It usually relies on a Fabry-Pérot cavity of variable thickness, various techniques being used to make the mirrors of the cavity.

One technique is described in the article by A. Spisser et al., "Highly Selective 1.55 micrometer InP/airgap micromachined Fabry-Perot filter for optical communications" in Electronics Letters, No. 34(5), pages 453-454, 1998. Other embodiments have been proposed, using micromachined silicon, and alloys based on gallium arsenide.

In all the configurations, and in particular in that described by Spisser et al., who make the mirrors of the cavity by virtue of InP/air "Bragg mirrors", thin membranes of small diameter (of the order of from 40 to 200 µm) are involved.

Hence, the diameter of the beam must be compatible with the diameter of the membranes, this necessitating optical means of collimation or focusing. A known means of achieving this focusing is the butt welding to the fiber of a silica bar followed by a graded-index lens. For example, such assemblies are marketed by the company Highwave under the name Gradissimo®, and may provide a Gaussian spot a few tens of µm in diameter. Other companies similarly offer fibers furnished with a lens at one of its ends. This setup is commonly called a lensed fiber.

A simple layout for a filter component is therefore:
lensed optical fiber—filter—lensed optical fiber To obtain an insertion loss limited to 0.5 dB when a light ray passes from one lensed optical fiber to another entails complying with tolerances on the mutual position of the fibers and of the optical component. An order of magnitude of tolerances to be complied with is as follows:
relative tolerance of positioning of the lensed fibers along a longitudinal axis (z) of the fibers: ±25 µm;
relative tolerance of positioning of the lensed fibers along axes (x, y) perpendicular to the longitudinal axis: ±2 µm;
relative tolerance of angular positioning of the lensed fibers: ±5 mrad.

To comply with such tolerances, it is possible to introduce light into the entrance fiber, and to optimize the position of the exit fiber by using the optical signal, then to immobilize it. This process, called dynamic alignment, is extremely accurate, but lengthy and hence expensive, since the various degrees of freedom are not absolutely independent in practice.

The invention is aimed at proposing a process and a device that are very simple and make it possible to achieve in a passive manner, that is to say without introducing light into the entrance fiber, a sufficient tolerance for the positioning of two optical fibers and of an optical component, at the price of a small increase in the insertion loss as compared with dynamic alignment.

Many optical fiber based components are mounted by successively threading through a common capillary the fibers, the lenses and an optical component which by construction has been given a cylindrical shape.

In the case of small diameter tunable Fabry-Perot filters such as those consisting of InP membranes, a further difficulty prevents the use of this known technique: the filter must likewise be centered along axes (x, y) perpendicular to the longitudinal axis (z) of the optical fibers and oriented angularly in a very accurate manner with respect to the entrance and exit fibers. Moreover, it is necessary to access the electrical contacts situated on the filter for its tunability.

Nevertheless, it is still desirable to carry out the alignment between the entrance and exit fibers beforehand, so as to have to accurately position the filter only.

One could contemplate making two holes of the outside diameter of the fibers in a block of rigid material in which a location has been fashioned in the middle for the filter.

This leads to absolutely unrealistic machining tolerances (Ø126±1 µm over 10 to 15 mm of length). This process is therefore not applicable.

SUMMARY OF THE INVENTION

The invention is aimed at solving the problems enumerated above and accordingly a subject of the invention is a process for positioning an optical component between two optical fibers furnished at their end with lenses, characterized in that it consists in:
drilling a support in such a way as to fix therein a capillary tube whose inside diameter is designed so as to slip an optical fiber thereinto,
fixing the capillary tube in the drilling of the support,
making a blind cut of the support and of the capillary tube, in such a way as to separate the capillary tube into two parts, a first plane face of the cut being perpendicular to a longitudinal axis of the capillary tube,
positioning the component on the first plane face,
positioning an optical fiber in each of the parts.

A subject of the invention is also a device for positioning an optical component between two optical fibers furnished at their end with lenses, characterized in that it comprises a support through which is fixed a capillary tube, the support comprising a blind cut so as to separate the capillary tube into two parts, in that the cut comprises a first plane face perpendicular to a longitudinal axis of the capillary tube, and in that the component is positioned on the first plane face.

BRIEF DESCRIPTION OF THE DRAWING

The invention will be better understood and other advantages will become apparent on reading the detailed description of a mode of embodiment of the invention given by way of example, description illustrated by the appended drawing in which.

DETAILED DESCRIPTION OF THE PREFERRED EMBODIMENT

Figure 1:
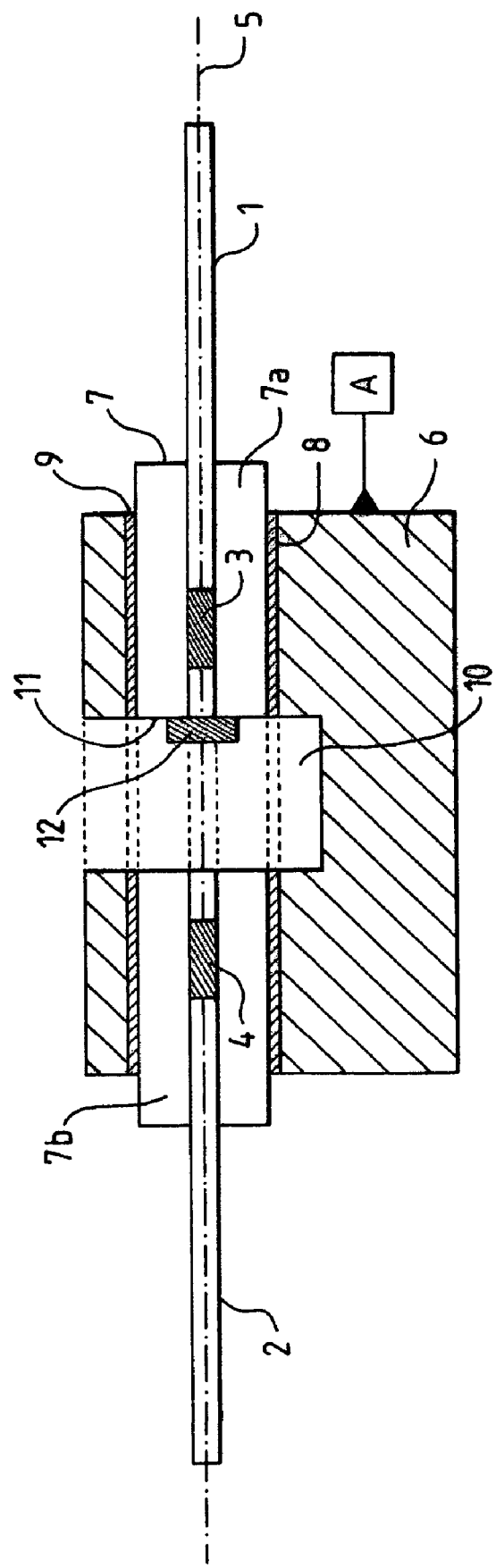
FIG. 1 illustrates a first variant of the process and device, in which variant the cut of the support comprises two parallel faces.

FIG. 1 illustrates the positioning of two optical fibers 1 and 2 furnished at their end with lenses, respectively 3 and 4. Advantageously, the lenses 3 and 4 focus a radiation which passes through them onto a Gaussian mode diameter of between 1 and 50 μm. Stated otherwise, the lenses 3 and 4 form focusing means.

One seeks to position the two fibers 1 and 2 directly in line with one another along an axis 5 with respect to a rigid support 6.

To do this, use is made of a capillary tube 7 whose inside diameter is designed so as to slip an optical fiber thereinto. The capillary tube and the optical fiber are chosen in such a way that the functional play between the outside diameter of the fiber and the inside diameter of the tube is as small as possible without there being any clamping. For example, conventionally, optical fibers exist whose outside diameter is 125 μm±1 μm. Likewise, capillary tubes of inside diameter 126−0/+1 μm exist. These tubes have a length of 50 mm and an outside diameter of 2 mm and are fairly cheap.

The support 6 is drilled in such a way as to fix the capillary tube 7 into a hole 8 thus produced. The hole 8 passes right through the support. The fixing of the capillary tube 7 into the hole 8 is, for example, achieved by gluing. In FIG. 1, the film of glue is represented with the label 9. Once the capillary tube 7 has been fixed in the hole 8 of the support 6, a blind cut 10 of the support 6 and of the capillary tube 7 is made. The cut 10 separates the capillary tube 7 into two parts 7a and 7b. Each part 7a and 7b is intended to receive one of the optical fibers 1 and 2. The two parts 7a and 7b which, after cutting, form two mutually separated capillary tubes, are by construction perfectly aligned.

A plane face 11 of the cut 10 is made in such a way as to be perpendicular to the axis 5. An optical component 12 can thus be positioned on the face 11. To reduce the tolerances of perpendicularity between the plane face of the cut 10 and the axis 5, it is possible to make the hole 8 from a reference face A of the support 6. The reference face A is an outer face of the support 6 and is perpendicular to the axis 5 of the hole 8 that is drilled in the support 6. Subsequently, when making the cut 10 and in particular its plane face 11, the face A will again be used as reference surface. This makes it possible to reduce the perpendicularity tolerances.

Advantageously, the positioning of the component 11 is carried out by marking the longitudinal axis 5 of the capillary tube 7 on the first plane face 11 of the cut 10, then by positioning the component 12 with respect to the mark thus defined. More precisely, two variants may be implemented to achieve the positioning of the component 12 on the plane face 11. The first variant is illustrated in FIG. 1. The capillary tube 7 is glued to the support 6 in such a way as together to form an optically homogeneous block. The marking of the longitudinal axis 5 of the capillary tube 7 and the positioning of the component 12 with respect to the mark is done by visual observation along the longitudinal axis 5 of the capillary 7.

Figure 2:
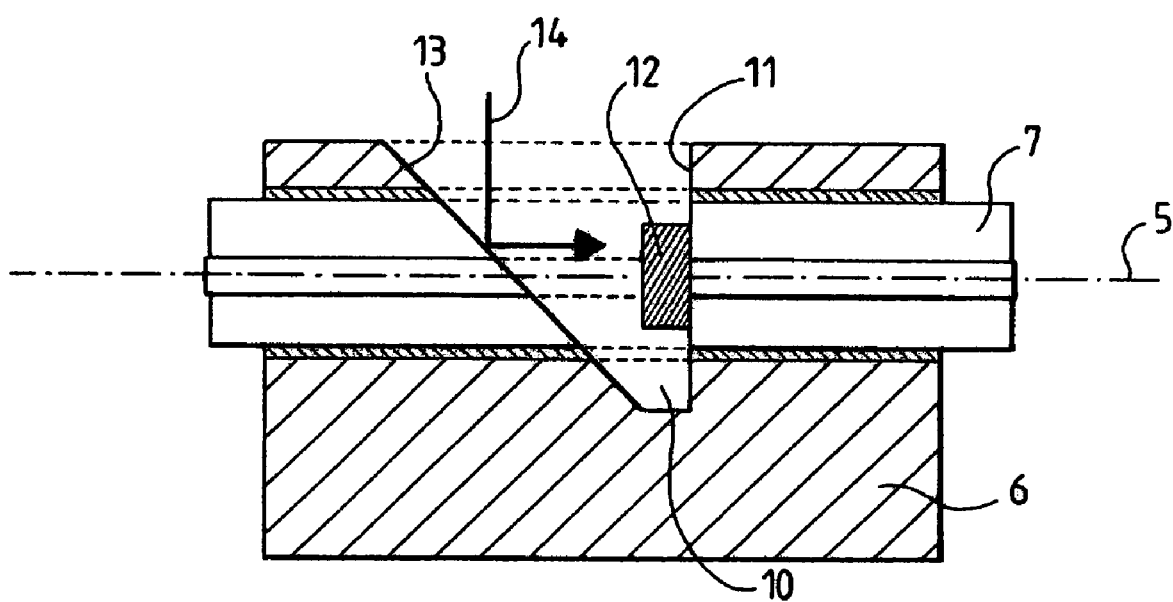
FIG. 2 illustrates a second variant of the process and device, in which variant the cut of the support comprises two faces forming an acute angle between them.

The second variant is illustrated in FIG. 2. A second plane face 13 of the cut 10 forms an acute angle with the first plane face 11 of the cut 10. The marking of the longitudinal axis 5 of the capillary tube 7 and the positioning of the component 12 with respect to the mark is done by visual observation using the second plane face 13 of the cut 10 as means of optical feedback. In this second variant, the axis of visual observation is demarcated by the arrow 14.

In the two variants making it possible to position the component 12, observation can be made with the aid of a microscope. A first observation of the capillary 7 is made after cutting 10 and before fitting the component 12. During this first observation the axis 5 is marked by means of a crosshair or reticule of the microscope. The component 12 is subsequently placed on the plane face 11 and a new observation is made while adjusting the position of the component 12 with respect to the crosshair or to the reticule of the microscope.

After having fixed the position of the component 12, the two optical fibers 1 and 2 are fitted. It is possible to take account of imperfections inherent in the manufacture of the optical fibers to further reduce the losses of the complete device. Noted among these imperfections are for example an off-centering of the core of the fiber or an angular discrepancy between the axis of the core of the fiber and the axis of its outside diameter. These defects will be embraced under the term: fiber alignment defect. To alleviate this defect, after positioning of the component 12, an optical fiber 1 or 2 is inserted into each of the parts 7a and 7b of the capillary tube 7, each fiber 1 or 2 is positioned translationally along the longitudinal axis 5 and rotationally about the longitudinal axis 5 so as to reduce to the maximum the optical losses due to a defect of alignment of the fibers 1 and 2.

Trials have shown that, by virtue of this latter operation, the maximum insertion loss was of the order of 1.5 dB. The measured loss is approached by carrying out dynamic positioning but with a significantly cheaper process.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

The invention claimed is:

1. A process for positioning an optical component between two optical fibers furnished at their end with lenses, comprising the steps of:
    drilling a support in such a way as to fix therein a capillary tube whose inside diameter is designed so as to slip an optical fiber thereinto,
    fixing the capillary tube in the drilling of the support,
    making a blind cut of the support and of the capillary tube, in such a way as to separate the capillary tube into two parts, a first plane face of the cut being perpendicular to a longitudinal axis of the capillary tube such that said two parts are aligned with each other,
    positioning the component on the first plane face, and
    positioning an optical fiber in each of the parts.

2. The process as claimed in claim 1, wherein the positioning of the component is carried out by marking the longitudinal axis of the capillary tube on the first plane face of the cut, then by positioning the component with respect to the mark thus defined.

3. The process as claimed in claim 2, wherein a second plane face of the cut forms an acute angle with the first plane face of the cut and in that the marking of the longitudinal axis of the capillary tube and the positioning of the component with respect to the mark is done by visual observation using the second plane face of the cut as means of optical feedback.

4. The process as claimed in claim 3, wherein each fiber is positioned translationally along the longitudinal axis and rotationally about the longitudinal axis so as to reduce to the maximum the optical losses due to a defect of alignment of the fibers.

5. The process as claimed in claim 3, wherein the lenses focus a radiation which passes through them onto a Gaussian mode diameter of between 1 and 50 μm.

6. The process as claimed in claim 2, wherein the capillary tube is glued to the support in such a way as together to form an optically homogeneous block, and in that the marking of the longitudinal axis of the capillary tube and the positioning of the component with respect to the mark is done by visual observation along the longitudinal axis of the capillary tube.

7. The process as claimed in claim 6, wherein each fiber is positioned translationally along the longitudinal axis and rotationally about the longitudinal axis so as to reduce to the maximum the optical losses due to a defect of alignment of the fibers.

8. The process as claimed in claim 6, wherein the lenses focus a radiation which passes through them onto a Gaussian mode diameter of between 1 and 50 μm.

9. The process as claimed in claim 2, wherein each fiber is positioned translationally along the longitudinal axis and rotationally about the longitudinal axis so as to reduce to the maximum the optical losses due to a defect of alignment of the fibers.

10. The process as claimed in claim 2, wherein the lenses focus a radiation which passes through them onto a Gaussian mode diameter of between 1 and 50 μm.

11. The process as claimed in claim 1, wherein each fiber is positioned translationally along the longitudinal axis and rotationally about the longitudinal axis so as to reduce to the maximum the optical losses due to a defect of alignment of the fibers.

12. The process as claimed in claim 11, wherein the lenses focus a radiation which passes through them onto a Gaussian mode diameter of between 1 and 50 μm.

13. The process as claimed in claim 1, wherein the lenses focus a radiation which passes through them onto a Gaussian mode diameter of between 1 and 50 μm.

14. The process as claimed in claim 1, wherein said two parts are aligned in a straight line.

\* \* \* \* \*